Patented Nov. 5, 1940

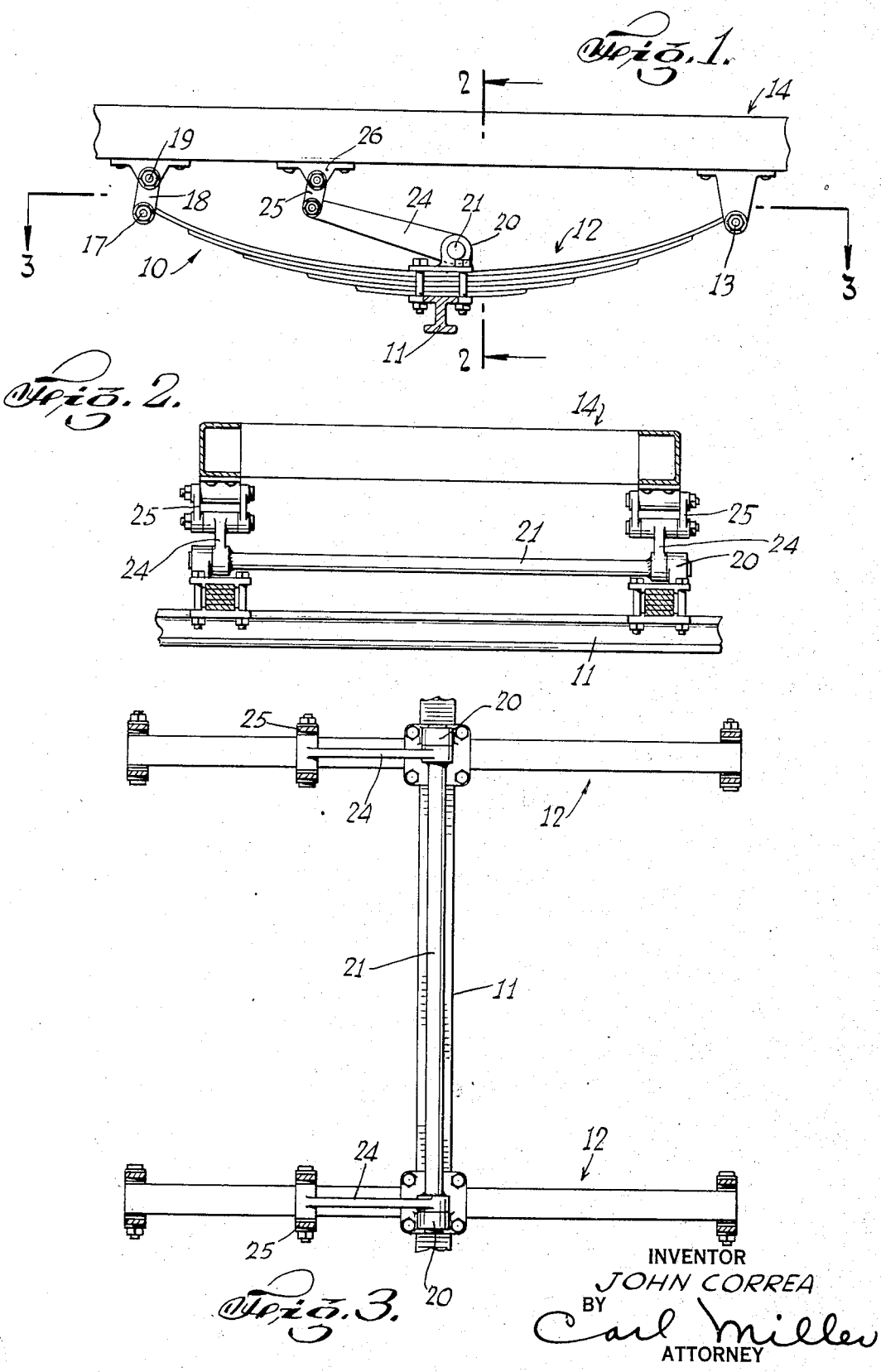

2,220,217

UNITED STATES PATENT OFFICE 2,220,217

SWAY STABILIZER AND SHOCK ABSORBER

John Correa, Clayton, Calif.

Application August 18, 1939, Serial No. 290,849

2 Claims. (Cl. 267—11)

This invention relates to sway stabilizers and shock absorbers for vehicles.

It is well known that when a vehicle turns a corner, there is greater pressure on the springs on one side than on the other side, making the chassis tilt. It is an object of the present invention to eliminate the tilting of the chassis and unequal strain distribution by providing means to equalize the shock on both sides of the chassis.

A further object of this invention is to provide a highly improved stabilizer and shock absorber construction of the character described, which may be applied to vehicle trailers or other vehicles in which the chassis is supported on springs attached to an axle, the construction being durable, inexpensive to manufacture, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of a chassis suspension equipped with sway stabilizer and shock absorbing apparatus, embodying the invention;

Fig. 2 is a cross-sectional view taken on line 2—2 of Fig. 1; and

Fig. 3 is a cross-sectional view taken on line 3—3 of Fig. 1.

Referring now in detail to the drawing, 10 designates vehicle construction, embodying the invention, comprising a usual axle 11, on which are mounted a pair of usual leaf springs 12. One end of each leaf spring is connected to a stud 13, fixed to the chassis or frame 14, whereas, the other end of each spring is connected, as at 17, to a shackle 18, pivoted as at 19, to said chassis or frame.

In the usual spring supporting chassis construction of the type described above, when the vehicle turns a corner, the leaf spring on the inside will take the greater strain and shock, causing the chassis 14 to tilt about a longitudinal axis.

Means is provided to equalize the shock and strain on the springs 12, and to prevent tilting of the chassis 14. To this end, there is fixed to each of the chassis springs 12, above the axle 11, a bearing 20. Rotatably mounted within the bearings 20 is a transverse shaft 21, parallel to and disposed above the axle 11. Fixed to the shaft 21 by welding, or in any other suitable manner, are a pair of parallel arms 24, preferably disposed on the inner sides of the bearings 20, and inclined upwardly and rearwardly from said shaft.

The outer ends of the arms 24 are connected by links or shackles 25 to brackets 26, fixed to the undersides of the side portions of the chassis 14.

A vehicle equipped with this stabilizer will not sway on the turn. As the pressure is increased on one spring, the pressure will be transmitted to the opposite spring, equalizing the pressure on both springs. A vehicle equipped with the stabilizer disclosed herein, can have all the weight on one side and yet the floor of the vehicle will be level. Such a stabilizer is especially useful on two wheel trailers, but may be applied to any automobile or vehicle, whereby the chassis is supported by leaf springs attached to the axle.

Since both arms 24 are fixed to the shaft 21, rotation of one arm 24 caused by pressure on one side of the vehicle, will result in a corresponding movement of the other arm 24, and since both arms 24 are attached by links 25 to a chassis or frame 14, such frame will have to remain in horizontal position, thereby eliminating tilting of the vehicle, and causing the shock to be taken up by both springs substantially equal.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a vehicle having an axle and a chassis frame, and a pair of right and left leaf springs connected at their mid portions to the axle, a bearing at the upper side of each spring forming a part of the connection between the springs and axle, said springs being attached at their outer ends to the chassis frame, a shaft rotatably mounted in said bearings above said axle, in superposed relation to said springs, a pair of arms fixed to opposite ends of the shaft, respectively above and in vertical alinement with said springs, and relatively short means to interconnect said arms to said chassis frame with said connecting means lying in substantially the same plane as the connections between the outer ends of the springs and said chassis, said arms being entirely located within the lengths of the springs and between said springs and chassis frame.

2. In combination with an axle and a chassis frame, a leaf spring connected at its mid portion to the axle, one end of the spring being connected to the chassis frame, a shackle interconnecting the opposite end of the leaf spring to the chassis frame, a bearing forming a part of the connection between the spring and axle and located at the upper side of the mid portion of the spring, a shaft rotatably mounted in said bearing, an arm fixed at one end to the shaft in vertical alinement with said spring, and a relatively short link interconnecting the other end of the arm to the chassis frame with said link connection lying in substantially the same plane as the connections between the ends of the spring and the chassis frame, said arm being entirely located within the length of the spring and between said spring and chassis frame.

JOHN CORREA.